Oct. 9, 1962 J. H. FORKNER 3,057,736
CACTUS PRODUCT AND METHOD
Filed Feb. 18, 1960 2 Sheets-Sheet 1

INVENTOR.
JOHN H. FORKNER
BY
Flehr & Swain
ATTORNEYS

United States Patent Office 3,057,736
Patented Oct. 9, 1962

3,057,736
CACTUS PRODUCT AND METHOD
John H. Forkner, Fresno, Calif., assignor to The Pillsbury Company, Minneapolis, Minn., a corporation of Delaware
Filed Feb. 18, 1960, Ser. No. 9,509
13 Claims. (Cl. 99—204)

This invention relates generally to the processes for the manufacture of compounded food products, and to new products resulting from such processes.

There is considerable commercial demand for a high quality compounded base ingredient in particle form which contains various food materials such as syrups, fruit flavor concentrates, and the like. By way of illustration, there is need in the baking industry for a base particle or fragment which is itself essentially flavorless but which is capable of readily assimilating many times its weight of liquid sugar, syrups, flavors, etc., in a simple processing step such as heating or boiling. There is a further need for such an ingredient which will not break down, run or dissolve during the mixing and baking operations, and after baking. In particular, such base particle or fragment should be resistant to oxidation or discoloration under these conditions and should retain sufficient moisture to remain soft, sliceable, and to provide an edible texture. It should also be translucent or of a light color adapted to readily assume added color or color ingredients. Moreover, such base ingredient should be capable of retaining these properties for prolonged periods of time, separately or as a component of food products, to insure a shelf life equal to commercial demand. The need for such a base ingredient is not limited to the baking industry; there is a similar need in the industries which produce desserts such as puddings, ice creams, gelatins, and also in the confectionery and canning industries, as well as many other industries.

Food processors are also in need of a homogeneous semisolid product, such as a jam, jelly or similar product, which can be satisfactorily employed as a filling in various heat processed foods. In bakery processing, for example, such a product should retain its identity and texture throughout the baking and during cooling, in contrast to the normal tendency of fillings to break down and run, and to stick to processing equipment or within the final package. It should also have the capacity of retaining moisture so as to prevent absorption by the surrounding dough or undue drying or hardening of the filling. It preferably should also possess a quality of tenderness or "shortness" to improve working characteristics and the eating qualities of the product. Finally it should provide a proper adherence to the dough. These characteristics are particularly essential to filled bakery products such as filled cookies, bars, wafers, and the like.

To date, few compounded base ingredients have proved entirely satisfactory for the above purposes, and most have been unsatisfactory in many respect. For example, where fruits have been used in compounding a base ingredient (e.g., as in glaceed fruits), it is generally necessary to preserve the fruit base prior to processing in a brine solution, in barrels. This procedure not only increases freight and handling costs, but necessitates draining and leaching of the salt from the fruit base prior to cooking, followed by successive cooking in the presence of flavor and sugar to implement the fruit base. Fruit bits of the type exemplified by Forkner U.S. Patent No. 2,650,881 become tough or hard through loss of moisture upon baking and storage in dry baked goods. A further difficulty, particuarly evident in bakery products, is the tendency of the base ingredients to break down and dissolve or spread through the product during the baking process, resulting in an undesired dilution of the fruit flavor and loss of the desired body and texture in the final product. Prior base ingredients are also highly susceptible to discoloration or oxidation to an undesirable form, either during the baking or in subsequent storage, a typical example being the burning, caramelization or discoloration of the particles at exposed surfaces of a baked product. The tendency of such base ingredients to dissolve, liquefy, or otherwise lose their identity upon exposure to hot or cold water, or upon cooking at elevated temperatures, is also well known.

The shortcomings justed noted are intensified in the case of jams, jellies, and other homogeneous fillings, particularly where it is desired to employ fresh or natural fruit flavors. With the exception of figs and fig bar products, and to lesser degree, apricots and peaches, so many additives are normally required to provide a workable filling that the resulting product is generally unsatisfactory for the intended purpose. A particular defect is the tendency of the filling to gel or become watery or slippery so that normal processing to extrude the filling between layers of dough is rendered difficult, if not impossible. Also gelation creates a smooth glassy surface that is not readily adherent to the dough coating. Baking and keeping properties are also entirely unsatisfactory, the filling tending to break and run and to lose moisture during the processing, and to become tough and rubbery or hard with cooling, or on the shelf. The use of starch and other additives to overcome this defect has not been widely accepted in the industry because of the recognizable alteration of flavor and palatability and other undesirable properties which normally result.

In general, it is an object of the present invention to provide an improved process, producing a new type of stable, compounded base ingredient which overcomes the above noted defects and problems facing the art.

Another object of the invention is to provide a process of the above character which will enable the production of compounded base ingredients of improved characteristics, useful as stabilizers in a wide variety of food processes and products without loss of identity.

A further object of the invention is to provide an improved process for providing compounded base ingredients of this character derived from cactus, such ingredients functioning as stabilizers to resist alteration of physical appearance or properties, flavor or color, of products in which they are employed.

Another object of the invention is to provide a base ingredient of this character in a smooth, homogeneous semisolid form useful, for example, as a filling.

Another object of the invention is to provide improved bakery products employing the processing and base ingredients of the invention.

Additional objects and advantages of the invention will appear from the following description in which the preferred embodiments have been set forth in detail in conjunction with the flow sheets of the accompanying drawing.

Referring to the drawing.

In general, the present invention relates to the production of a compounded base cactus product in fragment form having a substantial sugar content, and which may also include other food and flavoring ingredients. It also relates to a process for producing such products from dehydrated fragments initially derived from the hydrophilic vegetable cellulose found in the interior of cacti, and particularly that group of cacti known as "barrel" cactus (e.g., members of the tribe Cereeae, such as Ferocactus and Echinocactus). Broadly speaking, the production of such dehydrated fragments includes the harvesting, trimming and slicing of the cactus cellulose into thin wafers, of a thickness between about 1/16 to 5/8 inch, and drying the wafers to a moisture content of about 5% to thereby provide a hard moisture-resistant layer or skin on the outer surfaces of the wafers. These initial stages in the processing are disclosed and claimed in my copending application Serial No. 9,564, filed February 18, 1960. The processing also involves the cleaning and subsequent cracking or reduction in size of the wafers to fragments whereby the interior of the fragments is exposed at the cracked surfaces. These fragments are then subjected to sizing operations to produce a final, clean dehydrated fragment product of a size particularly adapted to rehydration and to subsequent assimilation of added ingredients. Such further processing steps are disclosed and claimed in my copending application Serial No. 9,565, filed February 18, 1960.

In carrying out the instant process, the dehydrated fragments are first washed and rehydrated, preferably in the presence of heat, to produce moist reconstituted cactus fragments approaching the original moisture content of the fresh cactus. After removal of excess water, the hydrated fragments are contacted with sugar in such manner that the sugar tends to displace the water in the cactus and to be assimilated by the rehydrated cellular structure of the cactus material. After draining, the resulting product can be used as is, or it can be subjected to further processing such as reduction in size, drying, or to special treatment. In a modified procedure, the intermixed treating liquid and sugar-containing fragments can be pulverized into a smooth, homogeneous final product, or additional fragments can be added to this homogeneous mixture to form a further homogeneous product containing fragments.

Figure 1:
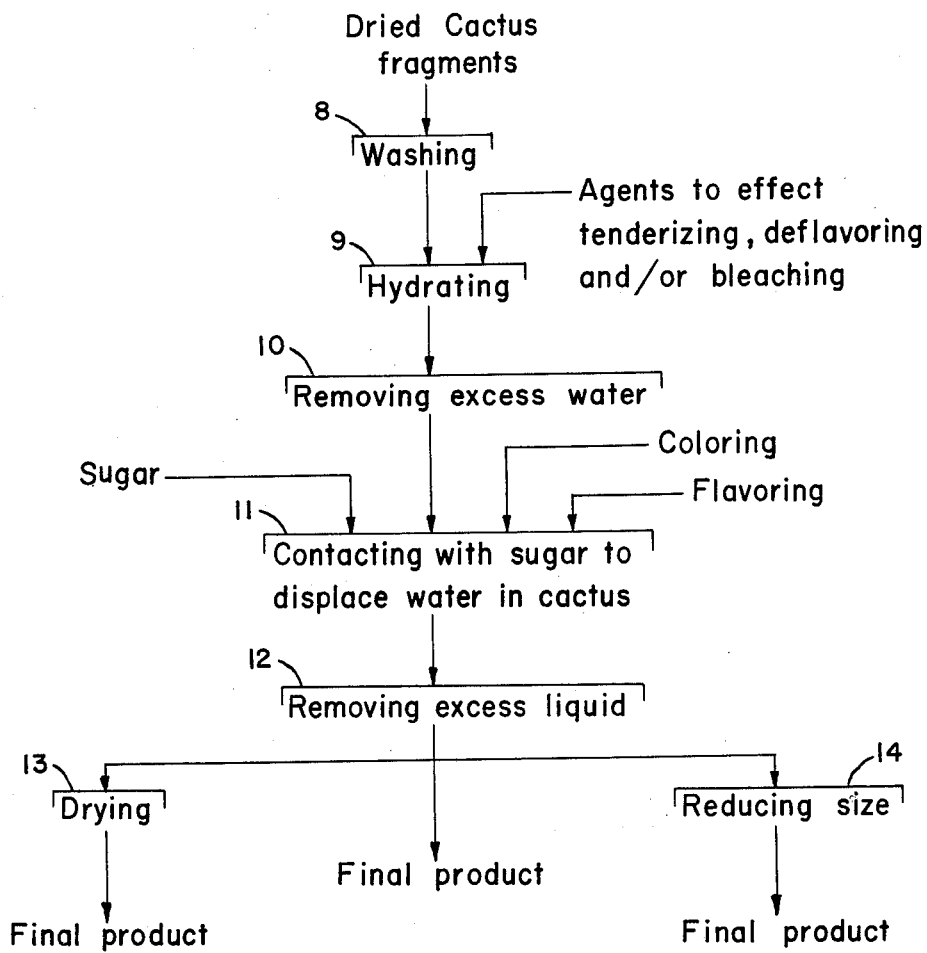
FIGURE 1 is a flow sheet illustrating one procedure for carrying out the present invention.

FIGURE 1 illustrates one procedure which can be followed to produce a product according to the present invention from dehydrated cactus base material. Thus in operation 8, dried cactus fragments are washed to remove any surface contaminants such as sand, dirt particles, etc., which are readily separable due to their greater density. At this point the fragments can be reduced in size, for example, in a hammer mill, although this is generally not necessary. In step 9, the washed fragments are hydrated, preferably by boiling in water for about 10 to 30 minutes (e.g., in a conventional agitated jacketed steam kettle). However, heat is not essential to effect hydration, and this operation can be successfully carried out in cold water. In a typical operation, the cactus fragments will rehydrate about 10 to 12 times their weight of water, and sometimes as much as 15 times their weight, to achieve a moisture content of about 90 to 95%. Although the rate and degree of hydration will vary somewhat with the particular variety of cactus employed, hydration is generally quite rapid, nearing completion in about 5 minutes under optimum conditions. If desired, hydration can be carried out in the presence of various agents to effect tenderizing, deflavoring and bleaching of the fragments. For example, a mild alkali such as lye or baking soda may be employed in the hydrating solution, in amounts up to about 1% by weight. The rate of hydration is apparently unaffected by change in pH.

During the treatment in step 9, a remarkable change takes place in the dehydrated cactus. The collapsed cells of the dehydrated material rapidly fill with water, and the fragments swell and expand to almost their original size. No discoloration takes place. More important, the fragments at all times retain their individual identity without any natural tendency to gel or form a pasty mass. The processing is consequently easily carried out and the resulting hydrated product can be drained or centrifuged in the step 10 to produce a nonsticky, relatively free-flowing product. Comminution to obtain uniform sizes can also be accomplished at this point, for example on an Urschel cut machine. As will appear, the hydrated product possesses characteristics which are both useful and surprising, and which make possible the production of bakery and other food products of unique exceptional quality.

In the next operation 11, the hydrated cactus fragments are contacted with sugar which acts to displace or effect an exchange with part of the hydrating water absorbed in the cells of the cactus. The sugar may be in various forms and may additionally contain fruit solids (preferably in colloidal form) as well as flavoring and color. Generally the sugar is added in the form of a liquid syrup, and the mix comprising the syrup and fragments concentrated to a stable product of say, 68 to 85% sugar. Concentration can be accomplished in the presence of heat, for example, by cooking at a temperature between about 160° F. to 250° F. or by use of vacuum or pressure. Following this processing, excess syrup can be removed in the step 12 to produce a final fragment product impregnated with the sugar (e.g., about 80% solids). If desired, this product can be subjected to further drying in the operation 13 to achieve a desired final moisture content of from 2 to 10%, or it can be ground in step 14, for example on a roller mill, or it can be subjected to both these operations.

As herein used, the term "sugar" is intended to include both crystallizing and noncrystallizing sugars in various forms, including dry sugars, sugar syrups, or sugars in combined forms, invert sugars, and the so-called "reducing sugars." Specific noncrystallizing sugars include honey, corn syrup, molasses and similar liquid sugars. Crystallizing sugars include the various commercial sugars (sucrose or saccharose), in granular, powdered or syrup form, obtained for example from the sugar beet or sugar cane. Mixtures of crystallizing and noncrystallizing sugars and syrups may also be employed. Inverted cane sugar in the form of a concentrated syrup (such as 60° Baumé) has also been used with good results. The sugar may also be employed in a compounded or combined form such as available in commercial jams, jellies, marmalades, spreads and similar preparations. Special formulas such as the so-called "gumdrop" type formula (e. g., prepared with thin-boiling starch, pectin, gum tragacanth, gum arabic, etc.) may likewise be employed, as may the basic sugar stabilizers, including the pectins, algins, gelatins, dextrins, and other agglutinizing agents.

With respect to the amount of sugar which may be added in operation 11, I may, for example, use 100 to 150 pounds of sugar solids for each 100 pounds of rehydrated cactus material derived from step 9. The sugar may be added totally, or progressively, as desired. Assuming an operation in step 11 where the mix is simmered for about two hours at 200° F. and then cooked for about 20 to 30 minutes in an agitated steam jacketed kettle at about 225° to 240° F., the proportions just specified will yield a material after centrifuging having a solids content of about 80% and containing sugar in proportions ranging from 8 to 10 times the weight of cactus solids. By way of illustration, a 1000 pound batch might contain 200 pounds water, 80 pounds cactus solids and 720 pounds sugar.

Figure 2:
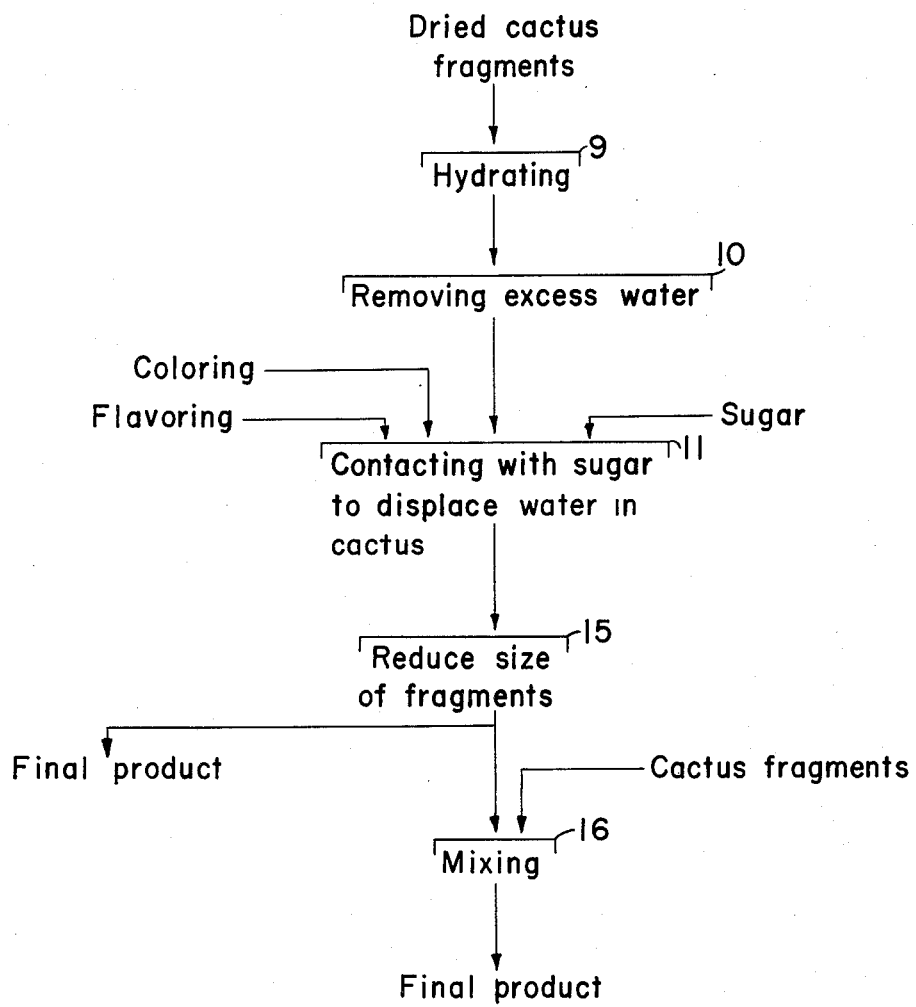
FIGURE 2 is another flow sheet illustrating a modified procedure for carrying out the invention.

Assuming hydration of the cactus fragments and contacting with sugar as in steps 9 and 11, described above it is frequently desirable to withdraw the intermixed treating liquid and sugar impregnated fragments for separate processing, and prior to the centrifuging operation 12. For example, as illustrated in FIGURE 2, the fragments dispersed in sugar syrup can be comminuted or otherwise reduced in size in step 15 to produce a smooth, jam-like homogeneous product or filling containing the cactus material as a stabilizer. This is of particular value where the contacting in step 11 is carried out with sugar in a compounded form such as a commercial jam or marmalade, as it permits the cactus to be incorporated as a stabilizer against any subsequent alteration of flavor, appearance or color of the jam or marmalade without effecting a change in the essential characteristics of the stabilized product. As a further variation, additional cactus fragments, preferably fragments derived from processing as in FIGURE 1, can be added in the operation 16 to provide coarse jamlike products containing additional cactus as a stabilizer.

The rehydrated sugar-containing cactus fragments (FIGURE 1) possess a number of highly desirable characteristics and properties which render them unusually adaptable for use as a base material in the food processing art: they are themselves essentially flavorless and colorless, so do not mask the flavor and color of added ingredients; they are in convenient fragment form, although containing about 90% sugar or sugary solution; they do not dissolve or otherwise lose their identity during conventional food processing (e. g., cooking, boiling, baking, etc.); they do not dissolve in unbaked refrigerated doughs, and do not burn or lose desired characteristics or color when partially exposed on dough surfaces during baking; they do not oxidize and consequently are stabilized against undesired alteration of flavor or appearance or color (without the use of added preservative) and impart this characteristic to foods in which they are incorporated; they do not break down when heated, individually or as a component of heated food products, and remain soft and tender in foods in which they are incorporated; they do not harden or toughen in baked goods (in cookies, for example, as the crumb structure dries out they retain sufficient moisture to be tender, and of edible texture); they also have sufficient resilience that they slice or spoon easily, and consequently are ideally suited for use in cakes, in ice creams, deserts, etc. These characteristics not only exist during processing, and in the fresh product, but are retained over long periods of time (at least six months, and generally up to a year or longer), permitting the manufacture of a wide variety of products which heretofore have not been available for commercial sale.

When the fragments are further reduced in size (FIGURE 2) the resulting subdivided particles continue to possess the desirable characteristics outlined above. More important, they have a capacity of imparting these characteristics to various homogeneous products into which they are incorporated (e.g., jams, marmalades, and similar fruit fillings) even though incorporated in relative small proportions. For example, a fruit filling for bakery purposes (containing 5 to 10% of the subdivided base ingredient) will be fully stabilized against normal bakery processing; it will not run or break down at baking temperatures as high as 555° F., and will not gel or toughen on cooling. This is particularly important in the production of filled bars, in view of the conventional practice of cutting these extruded bars as they come out of the oven. The base ingredient provides sufficient structural rigidity to the bars to prevent crushing or breaking during cutting, and also prevents adherence or sticking together of the cut pieces. Fillings of this type also retain a "short" characteristic which permits the baked product to break easily and which provides desired eating qualities without stringiness or tackiness of the filling. Such a filling is also essentially absorptive so that it holds and retains liquids at baking temperatures, and upon cooling, the moisture is prevented from running out and soaking into the surrounding dough jacket, causing the latter to disintegrate and the products to stick to one another or to the package. These characterisics are of particular importance to commercial processing; they impart a body to fillings, for example, so that roll pressures can be established to provide effective extrusion without slippage or break down of the filling. They also prevent gelling to a glassy or rubbery surface such as frequently prevents adherence of a filling to the dough (e. g., in filled bars, cookies, cakes, etc.). Stability against break down at baking temperatures also insures a desired body to the filling throughout the various processing steps.

The following examples are presented as illustrative of the wide range of usefulness and application of the sugar impregnated base materials of the invention:

*Example 1*

After harvesting, "barrel" cactus (variety—*Ferocactus wislizenii*) was trimmed of external skins and spines and the interior sliced to a thickness of about 3/16 inch for drying. The slices were dried in the sun for about 12 hours, causing formation of a relatively tough moisture-resistant outer skin. The dried wafers were washed and subdivided in a Rietz vertical hammer mill to produce fragments having a maximum diameter of less than ½ inch. These fragments were boiled in water for about 20 minutes causing a rapid rehydration from a moisture content of about 5% to an average of about 92%. Upon draining excess water, the reconstituted cactus fragments weighed about 118 pounds for each 10 pounds of initial dried fragments.

*Example 2*

Rehydrated cactus fragments, derived as in Example 1, were contacted with aqueous sugar solutions (50% sucrose) at 180° F. and for the period indicated in the table below, with the indicated results:

| Period of Contact in Minutes | Lbs. of Solution Adsorbed per lb. of Cactus | Percent Sugar in Solution Adsorbed | Lbs. of Sugar Adsorbed per lb. of Cactus | Percent Cactus in Final Product |
|---|---|---|---|---|
| 15 | 6.7 | 60 | 4.0 | 13.0 |
| 30 | 9.5 | 50 | 4.8 | 9.5 |
| 60 | 10.5 | 54 | 5.7 | 8.7 |
| 120 | 10.5 | 53 | 5.6 | 8.7 |

The sugar was readily assimilated in the fragments, with displacement of some of the water, causing the fragments to assume a candylike appearance and a strong sugar flavor.

*Example 3*

Following substantially the procedure of Example 1, dried wafers were washed, rehydrated by boiling in water and then diced in an Urschel slicer to produce uniform fragments. These fragments (95% moisture) were placed in contact with an equal proportion of substantially dry granulated sugar (moisture content less than 2%) causing assimilation of moisture by the sugar. The resulting sugary mixture containing fragments was boiled for one hour and held for a period of twelve hours. At the end of this period, it was found that most of the sugar had been absorbed by the fragments, and that the fragments had a sugar content of about 68% sugar on a dry solids basis.

*Example 4*

Barrel cactus (Echinocactus) was processed in the manner of Example 1 to produce dehydrated fragments having a moisture content of about 5%. The dehydrated fragments were boiled in a soultion containing 1 pound of lye to each 500 pounds of water for a period of 1 hour and the resulting fragments drained.

The process just described was repeated except that the fragments were boiled for 20 minutes in a solution containing 1 pound of lye to each 100 pounds of water.

The above processing was repeated employing equivalent proportions of baking soda ($NaHCO_3$).

In each case, the cactus fragments were softened in texture, and substantially debittered. Upon further washing a bland flavor results.

*Example 5*

Two pounds of dried cactus fragments were rehydrated as in Example 4 and boiled with 28 pounds 60° Baumé inverted cane sugar syrup and 7 pounds of glucose for about 25 minutes. Upon draining excess moisture, the resulting product was found to comprise about 5% cactus solids, 60% invert sugar, 15% glucose and the remainder water.

*Example 6*

Fruit-like cactus fragments were prepared employing the following ingredients on a dry weight basis:

| Ingredient | Apple, percent | Cherry, percent | Blueberry, percent | Lime, percent |
|---|---|---|---|---|
| Cactus fragments | 4.9 | 5.0 | 5.2 | 5.9 |
| Invert sugar | 60.3 | 62.4 | 65.0 | 73.8 |
| Glucose | 15.0 | 15.6 | 16.3 | 18.5 |
| Citric acid | 1.1 | 0.6 | 0.6 | 0.7 |
| Salt | 0.5 | 0.3 | 0.5 | 0.4 |
| Apple concentrate | 15.1 | | | |
| Apple flavor | 0.7 | | | |
| Cinnamon | 0.6 | | | |
| Cinnamon flavor (red hot) | 0.9 | | | |
| Nutmeg | 0.9 | | | |
| Cherry-canned | | 15.4 | | |
| Cherry flavor (Fritzsche) | | 0.2 | | |
| Color | | 0.5 | | 0.4 |
| Blueberries | | | 9.5 | |
| Givaudan Blueberry flavor | | | 0.9 | |
| Lime powder (Fritzsche) | | | | 0.1 |
| Lemon oil | | | | 0.2 |

In each case the cactus fragments were rehydrated and drained as in Example 1, and then boiled for approximately 1 hour with a 40% solution of the invert sugar and glucose. The fruit concentrates, starch, salt and coloring were added at the end of the cook and the fragments drained and dried to about 85% solids to produce fruit colored and flavored, sugar-like fragments.

*Example 7*

Fruit bits were derived substantially as in Example 6 with the variation that the fragments were reduced in size in a hammer mill prior to rehydration. Upon subsequent processing as in Example 6, fruit colored and flavored bits ranging in size from about 1/32 to 1/4 inch, and containing about 87% solids, were obtained.

*Example 8*

The fragments of Example 6 were each incorporated with the ingredients of a conventional packaged gelatin dessert, and the dessert prepared in customary fashion and allowed to cool. In each case, the fragments retained their identity, color and flavor throughout the processing and, when properly agitated, remained suspended in the final product without undesired color run or breakdown.

The processing was repeated except that the fruit-like fragments were added to conventional custard and tapioca dessert mixes, with substantially identical results insofar as maintenance of fragment identity and characteristics.

*Example 9*

Employing substantially the procedure of Example 6, nut flavored sugar-like fragments were prepared from vacuum dried cactus fragments according to the following formulations, on a dry weight basis:

| Ingredient | Walnut, percent | Almond, percent |
|---|---|---|
| Cactus fragments | 4.7 | 4.7 |
| Invert sugar | 59.1 | 59.1 |
| Glucose | 14.8 | 14.8 |
| Walnut paste (Walnuts, glucose and granulated sugar) | 21.2 | |
| Fritzsche Walnut | 0.2 | |
| Almond paste | | 21.2 |
| Fritzsche Almond Oil | | 0.2 |

The resulting products had a pleasing, distinctly nut-like flavor and character.

*Example 10*

Apple and cherry fragments from the processing of Example 6 were placed on top of freshly prepared cookie dough and partially indented to expose about one-third of the surface area. Upon baking the cookies in conventional manner at a temperature of 375° F. for about 8 to 10 minutes, the fragments did not discolor, remained soft, and retained their characteristic apple and cherry flavor.

*Example 11*

Dough for cinnamon rolls was prepared in conventional manner. Apple fragments prepared as in Example 6 were placed between the layers of the dough along with additional amounts of cinnamon and cinnamon flavor, and the dough placed in a refrigerator. After two days, some rehydration of the fragments was noted but there was no breakdown or bleeding of color into the dough. Following baking at a temperature of 425° F. for about 10 minutes, no darkening or other discoloration of the fragments was observed.

*Example 12*

Cactus stabilized jamlike products were prepared according to the following formulations on a dry weight basis:

| Ingredient | Apricot | Banana | Pineapple | Rasberry |
|---|---|---|---|---|
| Cactus fragments, lbs | 2 | 2 | 2 | 2 |
| Granulated sugar, lbs | 11.5 | 11.5 | 11.5 | 11.5 |
| Invert sugar, lbs | 11.5 | 11.5 | 11.5 | 11.5 |
| Glucose, lbs | 11.5 | 11.5 | 11.5 | 11.5 |
| Salt, gr | 48 | 40 | 40 | 40 |
| Gum arabic, gr | 80 | 80 | 80 | 80 |
| Starch, gr | 435 | 435 | 435 | 435 |
| Citric acid, gr | 88 | | 88 | 88 |
| Lemon flavor, gr | .56 | .56 | | .56 |
| Apricot flavor, gr | 2.3 | | | |
| Color, gr | .8 | .08 | .24 | 12 |
| Apricot puree, lbs | 11.5 | | | |
| Banana flavor, gr | | 6.4 | | |
| Banana puree, lbs | | 11.5 | | |
| Rasberry (Firmenich) gr | | | | 5.6 |
| Rasberries, frozen, lbs | | | | 11.5 |
| Lemon oil, gr | | | .56 | |
| Pineapple flavor, gr | | | 2.4 | |
| Pineapple concentrate, lbs | | | 11.5 | |

In each case, the cactus fragments were cooked at a simmer stage (210° F.) with the glucose, granulated and invert sugars. Cooking was continued for about two hours at which point the fruit concentrates, starch, salt, gum arabic and coloring were added. During the cooking, the jam was concentrated to about 80% solids. The flavor was added last.

*Example 13*

The products of Example 12 were placed in a Waring Blendor and agitated and comminuted for about 5 minutes to produce smooth, homogeneous jamlike products.

As a further alternative, fragments of corresponding color and flavor (Example 6) were added to these jamlike products to produce homogeneous jamlike products containing fruit flavored sugar-like fragments. Upon observation for several weeks, there was no indication of color run or breakdown of the added fragments.

*Example 14*

The jams prepared as in Example 12 were placed in the center and on top of samples of unbaked biscuit dough. The dough samples were then baked at a temperature of 400° F. for a period of 8 to 12 minutes. No burning or discoloration was observed, nor was there any tendency of the jams to be absorbed into the surrounding dough. The jams were soft and palatable. The baked goods were packaged and observed for a period of several days, during which period the jams remained soft and palatable, with little loss in moisture content.

Example 15

Dough for fruit-filled bars was prepared according to the following formula:

| | | |
|---|---|---|
| Flour | lbs | 30 |
| Sugar | lbs | 10½ |
| Invert syrup | lbs | 4½ |
| Shortening | lbs | 10½ |
| Eggs | lbs | 6 |
| Nonfat milk | lbs | 3 |
| Salt | oz | 7½ |
| Soda | oz | 3 |
| Baking powder | oz | 3 |
| Vanilla | oz | ¾ |
| Water | lbs | 3 |

The sugar and shortening were creamed in conventional fashion, after which the invert syrup, eggs milk, salt, soda, baking powder were added in succession. The resulting mixture was creamed, the flavor added with half the flour and water, and the mixture creamed again. The final mixture was achieved by adding the balance of water and flour.

Jams, derived as in Example 12, were ground and fed with a quantity of the dough prepared as above to a two-roll standard cracker machine, causing the jams to be extruded as a filling between the dough to produce a filled bar or cookie. The result is an extruded bar, resembling a conventional fig bar, but in this case containing other fruits and flavors. The extruded bars were fed in a continuous stream directly into an oven and baked 10 minutes at 425° F. The baked bar discharged from the oven was cut with a guillotine knife cutter and showed no tendency to compress or "squash" under the knife. Upon cooling, the cut bars retained their separate identity without tendency to stick to one another and without any evidence of breakdown or draining of the filling. The resulting bars broke cleanly without "tackiness" and the filling was soft, tender and very palatable.

Example 16

Cherry flavored fragments derived from the processing of Example 6 were added to vanilla ice cream which was placed under refrigeration for 2 days. Following this period the fragment particles had softened to a desired texture without color run or breakdown and retained the characteristic cherry flavor and appearance. The resulting ice cream product was very palatable and spooned easily.

Example 17

One hundred grams of cactus fragments, hydrated by boiling in water for 30 minutes at atmospheric pressure, were contacted with the following "gumdrop" formula:

| | | |
|---|---|---|
| Starch base: | | |
| Crystal sugar | lbs | 50 |
| Liquid glucose | lbs | 75 |
| Thin boiling starch | lbs | 15 |
| Water | gals | 10 |
| Cream of tartar | oz | 2 |
| Agar-agar: | | |
| Agar-agar | lbs | 1¾ |
| Water | gals | 6½ |
| Sugar | lbs | 50 |
| Glucose | lbs | 20 |
| Pectin: | | |
| Water | gals | 2½ |
| Pectin | oz | 20 |
| Glucose | lbs | 20 |
| Granulated sugar | lbs | 20 |
| Citric acid solution | oz | 6¼ |
| Flavor and color. | | |

Contact was maintained in the presence of low heat (200° F.) for a period of several hours, and continued at room temperatures overnight. After draining and setting, the fragments resembled commercial gumdrop fragments, in texture and appareence, but possessed the added advantage that they did not break down upon subsequent use in baked goods.

Example 18

A cookie dough was prepared according to the following formula:

| | |
|---|---|
| Granulated sugar | 3 lbs. 8 oz. |
| Shortening | 1 lb. 2 oz. |
| Salt | 2 oz. |
| Mixed spices | 1 oz. |
| Soda | ½ oz. |
| Whole eggs | 8 oz. |
| Liquid milk | 1 lb. 12 oz. |
| Ammonia | ½ oz. |
| Cake crumbs | 3 lbs. |
| Cake flour | 4 lbs. |
| Mixed fruit (Example 6) | 3 lbs. |

The sugar and shortening were creamed and the other ingredients added in conventional fashion. The resulting cookie dough containing mixed fruit bits (derived as in Example 6) was placed in pans and baked at 410° F. for about 8 to 10 minutes. The resulting cookies were crisp and chewy and the particles showed no tendency to stick to the pan, either during or after baking. Fruit bits partially exposed at the surface of the cookies were not discolored or burned. The fruit bits were soft and tender and retained this characteristic after several weeks storage.

It will be evident from the foregoing that my process provides a satisfactory commercial method for the production of valuable products from cactus. The cactus is first trimmed and dried in slices, and cracked to form dehydrated fragments. These fragments are then rehydrated and contacted with sugar in various forms, in operation 11, to provide discernible fragment-like products containing sugar. During the contacting in step 11, various flavors, colors, etc., such as fruit flavors or juices, can be employed to impart flavor and color to the products. The product, when used in this manner as a carrying base for fruit flavors, syrups, etc., is superior in that it retains its identity while imparting stabilizing characteristics to the product into which it is incorporated, and acts positively to retain the principal characteristics of the various added flavors, concentrates, or syrups, in appearance, odor, taste and color. The product is also adapted to further processing, as in FIGURE 2, to provide a smooth homogeneous product ideally suited to use as a fruit or sugar-containing filling or coating, particularly in baked goods and similar products.

I claim:

1. In a process for the formation of a compounded base food product, the steps of causing fragments of dried cellular spongy cactus material to be contacted with water to hydrate and swell and expand the collapsed cells of said fragments, and contacting the hydrated fragments with sugar to cause the sugar to displace water in the expanded fragments and thereby to impart a substantial sugar content to the resulting product, at least a part of the contacting sugar being in liquid solution at the time of displacement of the water.

2. In a process for the formation of a compounded base food product from dehydrated cactus fragments, the fragments being produced by drying material derived from the interior of fresh cactus to achieve a dry spongy cellular characteristic, the steps of causing the dry fragments to be contacted with water to hydrate and expand collapsed cells of the cactus and to swell the fragments, and contacting the hydrated fragments with sugar substantially in liquid form to cause the sugar to displace water in the fragments and to impart a substantial sugar content to the resulting product.

3. A process as in claim 2 in which the water contacting the fragments is at boiling temperature.

4. A process as in claim 2 in which the water contacting the fragments is alkaline.

5. A process as in claim 2 in which excess water is removed from the rehydrated material before contacting the same with sugar.

6. In a process for the manufacture of a cactus product from dehydrated cactus fragments, the fragments being produced by drying thin slices of material derived from the interior of fresh cactus and the dry slices thereafter reduced in size to provide fragments, the steps of adding water to the fragments to hydrate the fragments and to swell and expand the dry collapsed cells of the same, contacting the rehydrated fragments with liquid sugar to cause the sugar to displace water in the cells, and thereafter reducing the size of the sugar-containing fragments.

7. A process as in claim 6 wherein moisture is removed from said sugar-containing fragments prior to being reduced in size.

8. A process as in claim 6 wherein said fragments are reduced in size while in contact with the liquid sugar, to obtain a smooth homogeneous product containing pulverized fragments.

9. A process as in claim 8 wherein additional cactus fragments are added to the homogenous product to produce a smooth homogeneous product containing said added fragments.

10. As a new article of manufacture, a food product comprising a rehydrated cactus fragment composed essentially of hydrophilic cellular cactus material, the cells of said cactus material containing added sugar.

11. A food product as in claim 10 wherein said sugar is in solid form.

12. A food product as in claim 10 wherein said sugar is in liquid form.

13. A cactus product in fragment form comprising rehydrated cactus fragments containing liquid sugar in amounts many times the weight of the fragments (on a dry basis), said fragments being characterized by their ability to resist alteration of size, flavor, appearance and color upon sustained heating at elevated temperatures.

References Cited in the file of this patent

UNITED STATES PATENTS

| | | |
|---|---|---|
| 2,420,517 | Brandner | May 13, 1947 |
| 2,733,145 | Karr | Jan. 31, 1956 |
| 2,797,165 | Harrington | June 25, 1957 |
| 2,844,476 | Rivoche | July 22, 1958 |

OTHER REFERENCES

Desrosier: "Technology of Food Preservation," 1959, Avi Publishing Co., pp. 132–167.

Prescott: "Food Technology," 1937, McGraw-Hill, pp. 406–408.